(12) United States Patent
Astakhov et al.

(10) Patent No.: US 9,590,311 B2
(45) Date of Patent: Mar. 7, 2017

(54) ANTENNA SYSTEM WITH REDUCED MULTIPATH RECEPTION

(71) Applicant: Topcon Positioning Systems, Inc., Livermore, CA (US)

(72) Inventors: Andrey Vitalievich Astakhov, Moscow (RU); Dmitry Vitalievich Tatarnikov, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 140 days.

(21) Appl. No.: 14/427,704

(22) PCT Filed: Aug. 26, 2014

(86) PCT No.: PCT/RU2014/000635
§ 371 (c)(1),
(2) Date: Mar. 12, 2015

(87) PCT Pub. No.: WO2016/032355
PCT Pub. Date: Mar. 3, 2016

(65) Prior Publication Data
US 2016/0064809 A1  Mar. 3, 2016

(51) Int. Cl.
*H01Q 1/36* (2006.01)
*H01Q 11/08* (2006.01)
*G01S 19/22* (2010.01)
*H01Q 3/44* (2006.01)
*G01S 19/36* (2010.01)

(52) U.S. Cl.
CPC .............. *H01Q 11/08* (2013.01); *G01S 19/22* (2013.01); *G01S 19/36* (2013.01); *H01Q 3/446* (2013.01)

(58) Field of Classification Search
USPC ................................ 343/895, 749, 866, 705
See application file for complete search history.

(56) References Cited

U.S. PATENT DOCUMENTS

| | | | | |
|---|---|---|---|---|
| 2,847,672 A * | 8/1958 | Killion | ................... | H01Q 11/08 343/895 |
| 4,700,197 A * | 10/1987 | Milne | ................... | H01Q 3/446 343/837 |
| 6,160,523 A | 12/2000 | Ho | | |
| 2003/0146872 A1 | 8/2003 | Kellerman et al. | | |
| 2013/0106664 A1* | 5/2013 | Igwe | ..................... | H01Q 11/08 343/705 |

FOREIGN PATENT DOCUMENTS

RU    2234776    8/2004

OTHER PUBLICATIONS

Search Report in PCT/RU/2014/000635, dated Aug. 14, 2014.

\* cited by examiner

*Primary Examiner* — Hoang Nguyen
*Assistant Examiner* — Hai Tran
(74) *Attorney, Agent, or Firm* — Bardmesser Law Group

(57) ABSTRACT

An antenna system with a sharp difference in directional pattern is intended for receiving GNSS signals. The antenna system includes at least two antenna elements located above a high-impedance capacitive ground plane, and a combining network. Antenna elements are spaced apart in vertical direction. The combining network provides subtraction of the signal reflected from the ground, the arrangement of antenna elements above the high-impedance capacitive ground plane making such subtraction efficient.

19 Claims, 15 Drawing Sheets

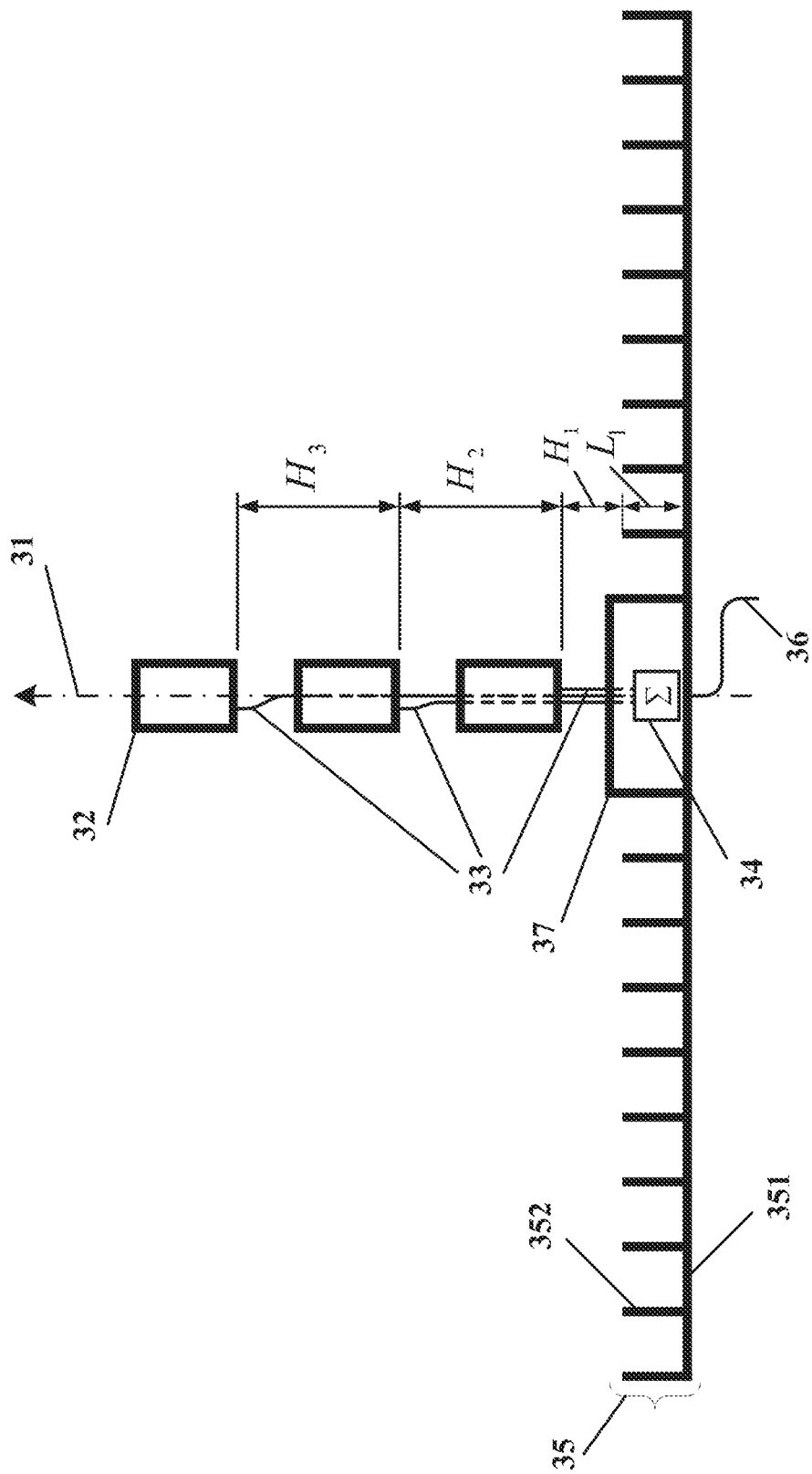

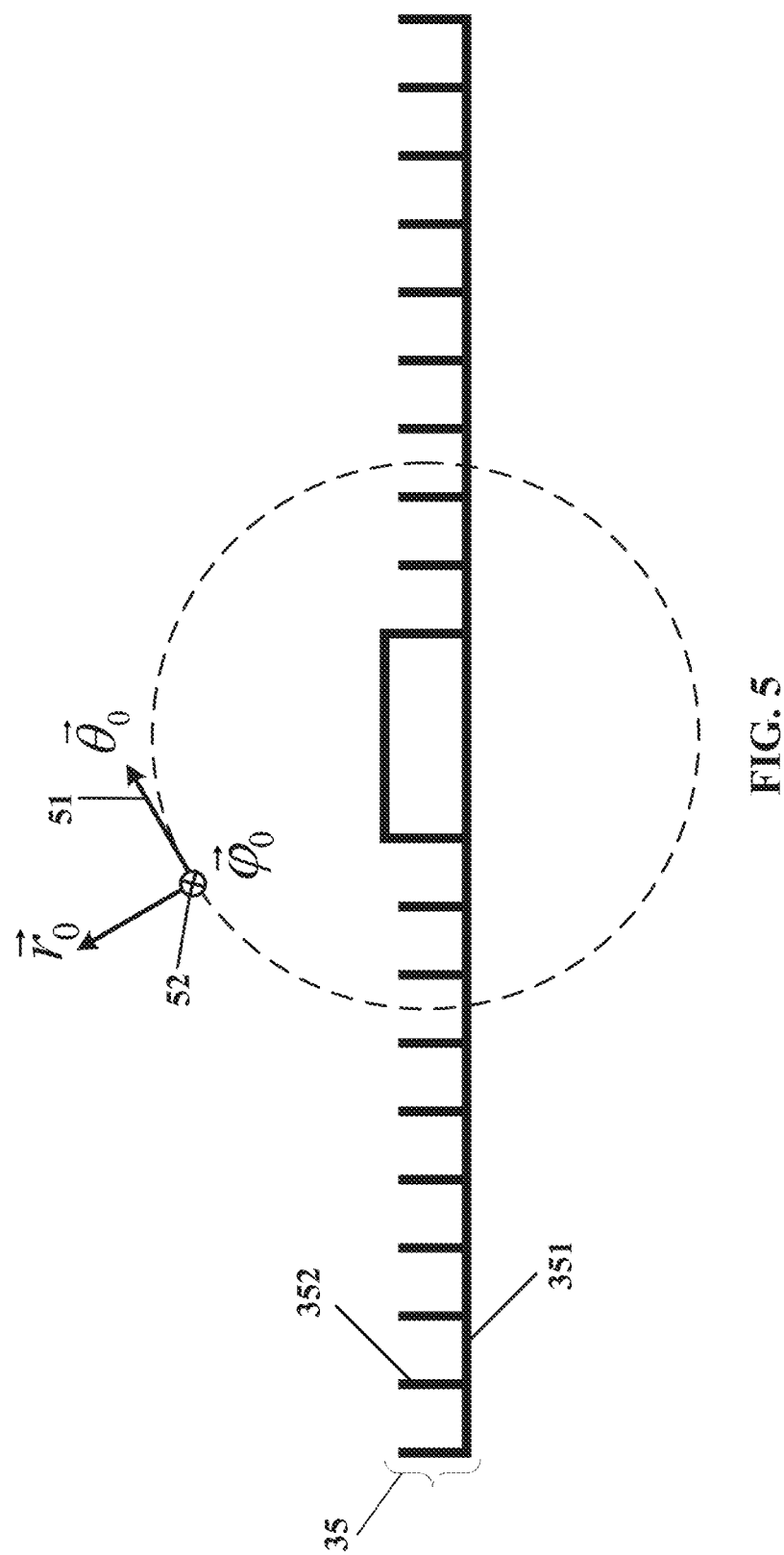

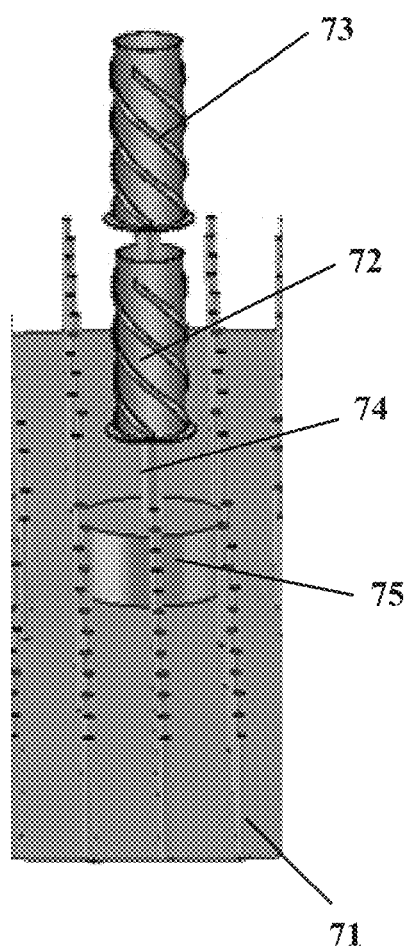
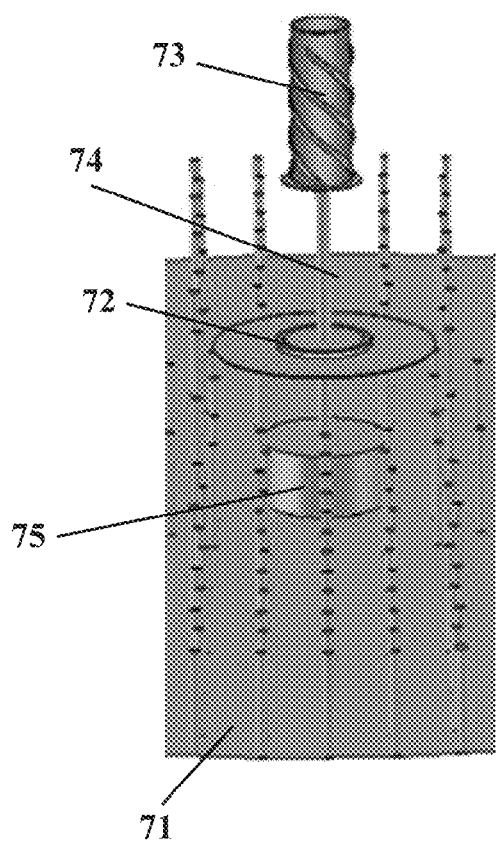
FIG. 7A                    FIG. 7B

ANTENNA SYSTEM WITH REDUCED MULTIPATH RECEPTION

BACKGROUND OF THE INVENTION

The present invention relates to a GNSS antenna with reduced multipath reception capable of cutting-off signals reflected from the ground. These signals are an important source of errors, so the decrease in reflected signals can lead to a higher positioning accuracy. This is especially critical for differential correction base stations. Signals from the satellites near the horizon are most vulnerable to distortions. To efficiently reject near-horizon satellite signals reflected from the ground, a special shape of directional patterns (DP) is required.

Different variants of such antennas are known, including vertical phase arrays, see, for example, U.S. Pat. No. 7,583,236, U.S. Pat. No. 5,534,882. Suppression of reflected signals is achieved by using a great number of radiators. This leads to a complex structure and a large vertical dimensions of the antenna. Moreover, there is an increase in losses in the antenna feeder, and a reduction of the antenna radiation efficiency.

There is also known an antenna structure where the radiator is on a flat (PCT/RU2013/000312) or spherical (U.S. Pat. No. 8,441,409) impedance ground plane. In this case, antenna radiation efficiency does not decrease, but a very large ground plane is needed to effectively reject signals from low satellites that are reflected from the ground.

The subject of this invention is an antenna system capable of decreasing the level of reflected signals, including that of low-elevation satellites, and yet guaranteeing smaller dimensions and structural simplicity.

SUMMARY OF THE INVENTION

A structure of the antenna system is proposed that comprises at least two antenna elements located over a high-impedance capacitive ground plane (HICGP) and a combining network. Inputs of the antenna elements are connected to outputs of the combining network. The combining network provides excitation of antenna elements with required amplitudes and phases, such that they can guarantee subtraction of the signal reflected from the ground surface. Placement of antenna elements above HICGP makes the subtraction effective and provides qualitative suppression of multipath signals, even when the number of antenna elements is small. The design of HICGP is described in, for example: D. Tatarnikov, et al., "Broadband convex impedance ground planes for multi-system GNSS reference station antennas", GPS Solutions, v15, N2, April 2011, pp. 101-108.

To avoid subtracting the direct (line-of-sight) signal from a satellite, the elements should be spread in the vertical direction.

To avoid undesirable shading of lower antenna elements by top elements, one embodiment proposes helical antennas as antenna elements.

Another embodiment proposes a ring-shaped phased array as a lower antenna element.

The proposed antenna design provides the required suppression of multipath at a noticeably smaller dimension of the impedance ground plane compared to stand-alone antenna elements on the ground plane. The proposed structure has essentially fewer elements in comparison with a conventional vertical array and, therefore, a smaller vertical dimension. The feeder lines therefore have smaller length and correspondingly less losses and a greater efficiency.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings:

FIG. 1 schematically presents space dividing into the upper and lower hemisphere, as well as incident (direct) and reflecting waves.

FIG. 2 shows an embodiment of the proposed antenna system with a flat HICGP.

FIG. 3 schematically presents an embodiment of the proposed antenna system with three antenna elements.

FIGS. 4A and 4B show a fragment of a flat HICGP.

FIG. 5 schematically presents vectors of electromagnetic field in the spherical coordinate system.

FIGS. 7A and 7B show external views of the proposed antenna system where antenna elements of different types are used as a lower element.

Figure 9:
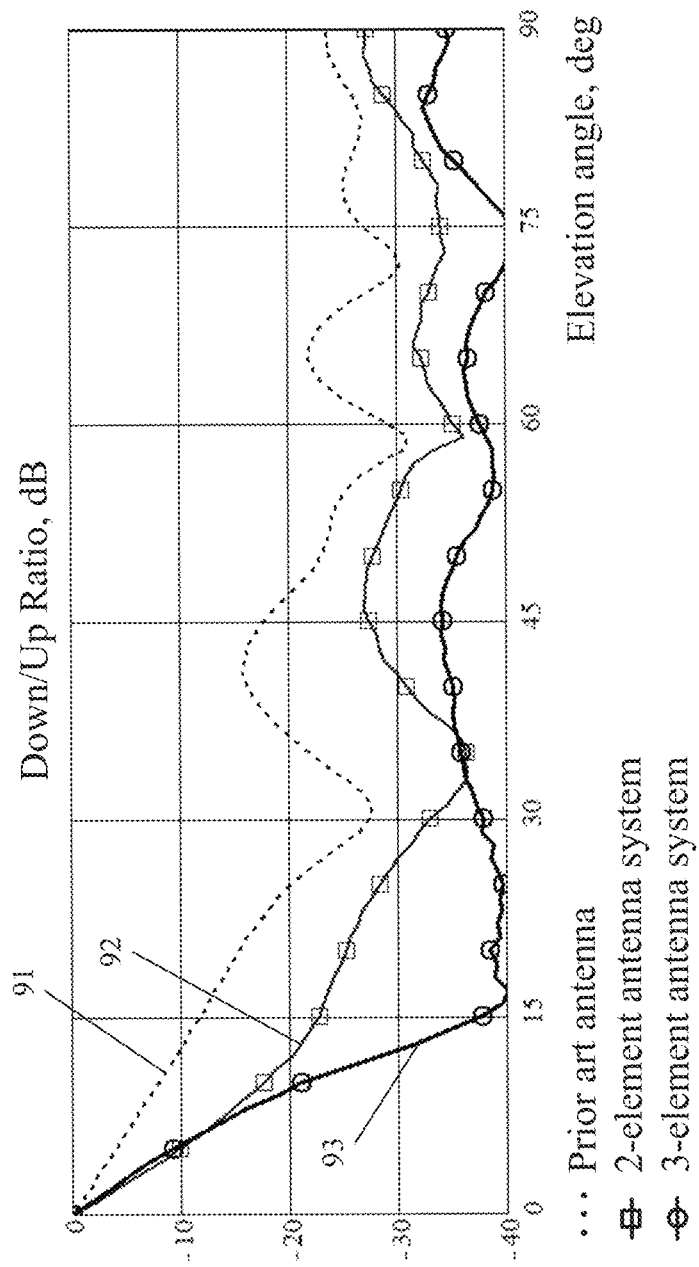

FIG. 9 presents graphs of Down/Up ratio for a single-element, two- and three-element antenna system.

Figure 10:
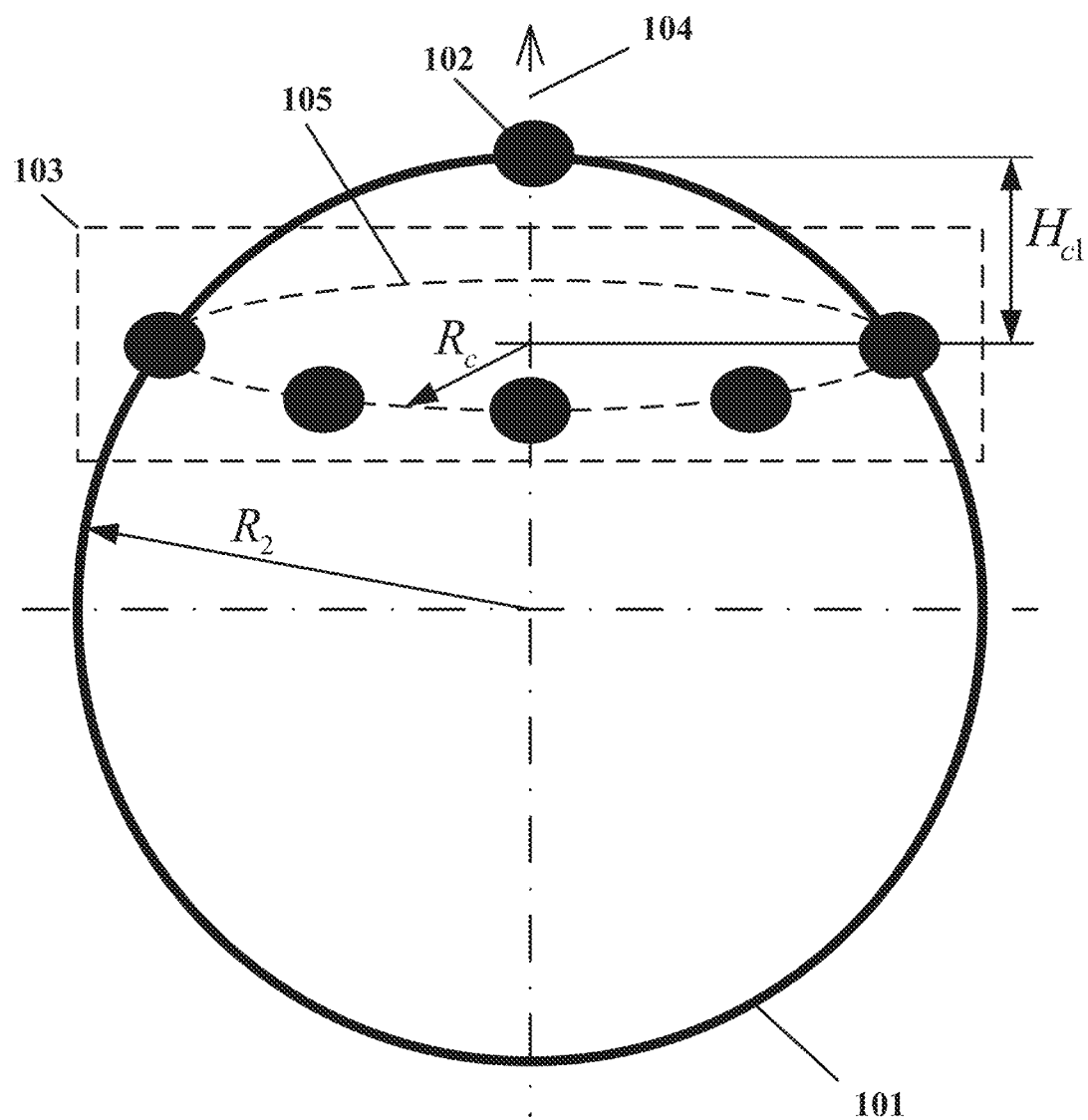

FIG. 10 schematically presents an embodiment of the proposed invention with a spherical HICGP.

Figure 11B:
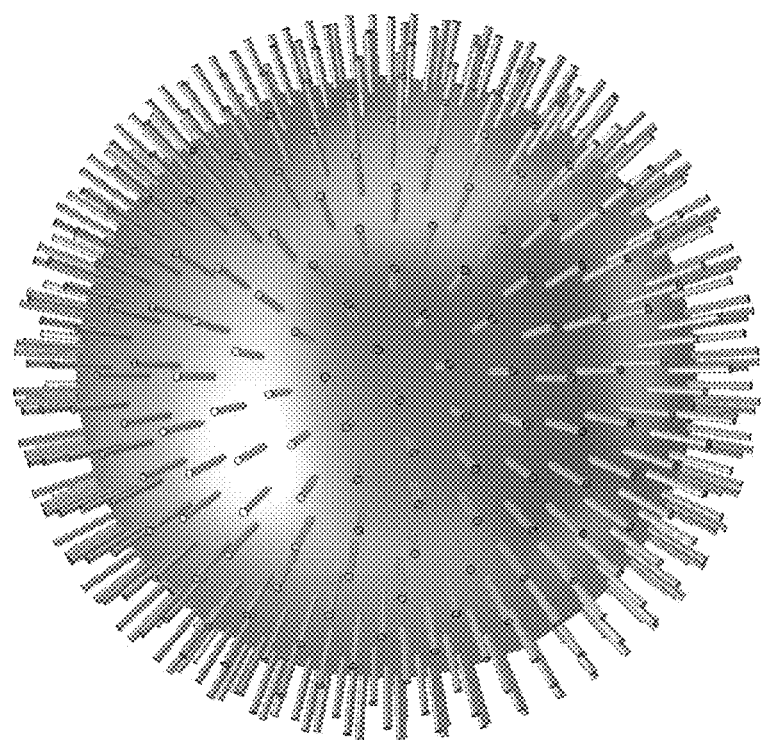
Figure 11A:
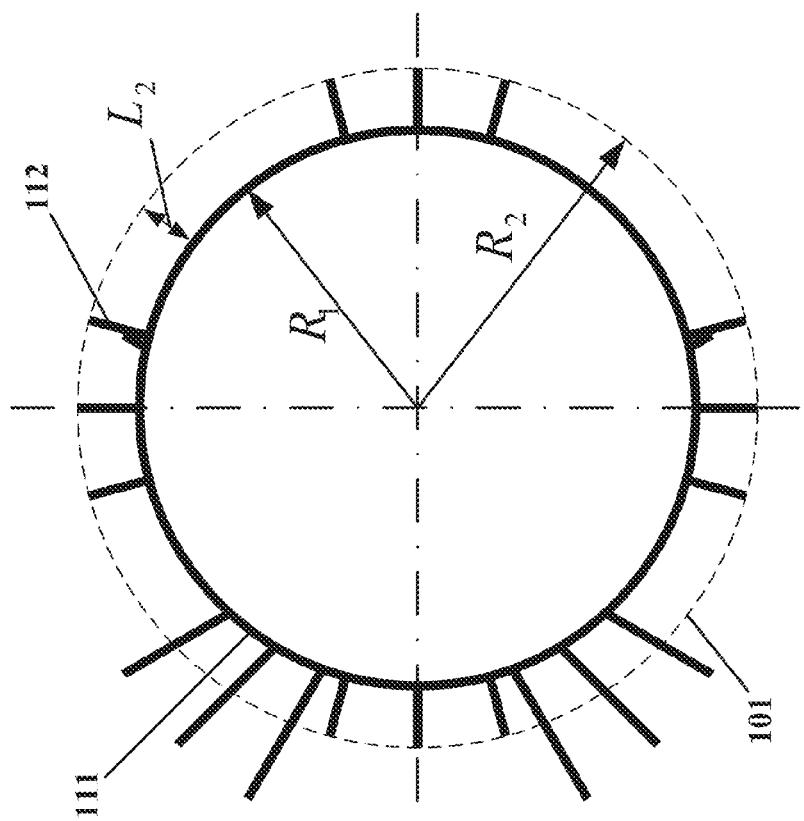

FIGS. 11A and 11B show a spherical HICGP.

Figure 12:
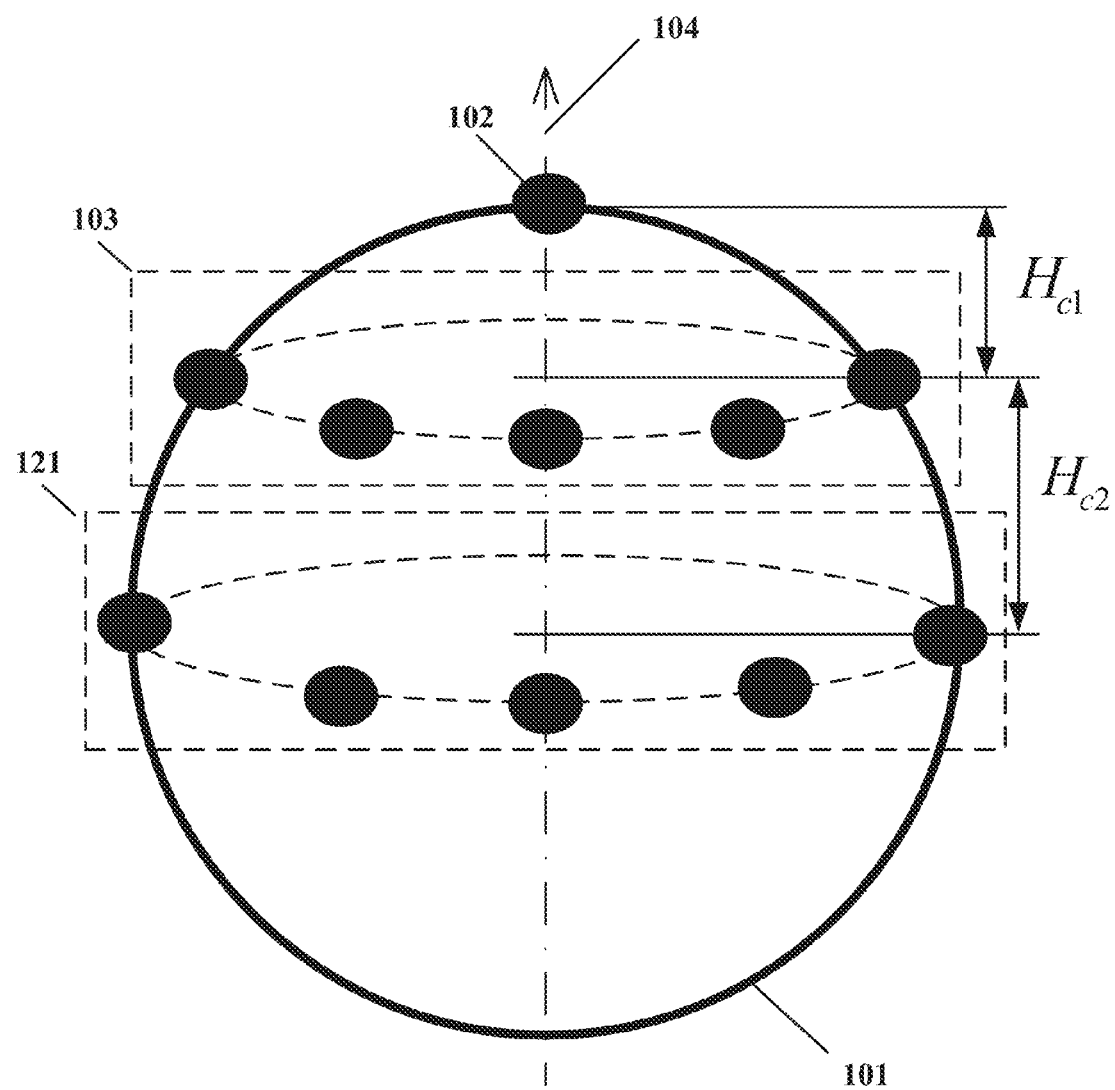

FIG. 12 schematically presents an embodiment with a spherical HICGP, where lower antenna elements are circular arrays of radiators.

Figure 13:
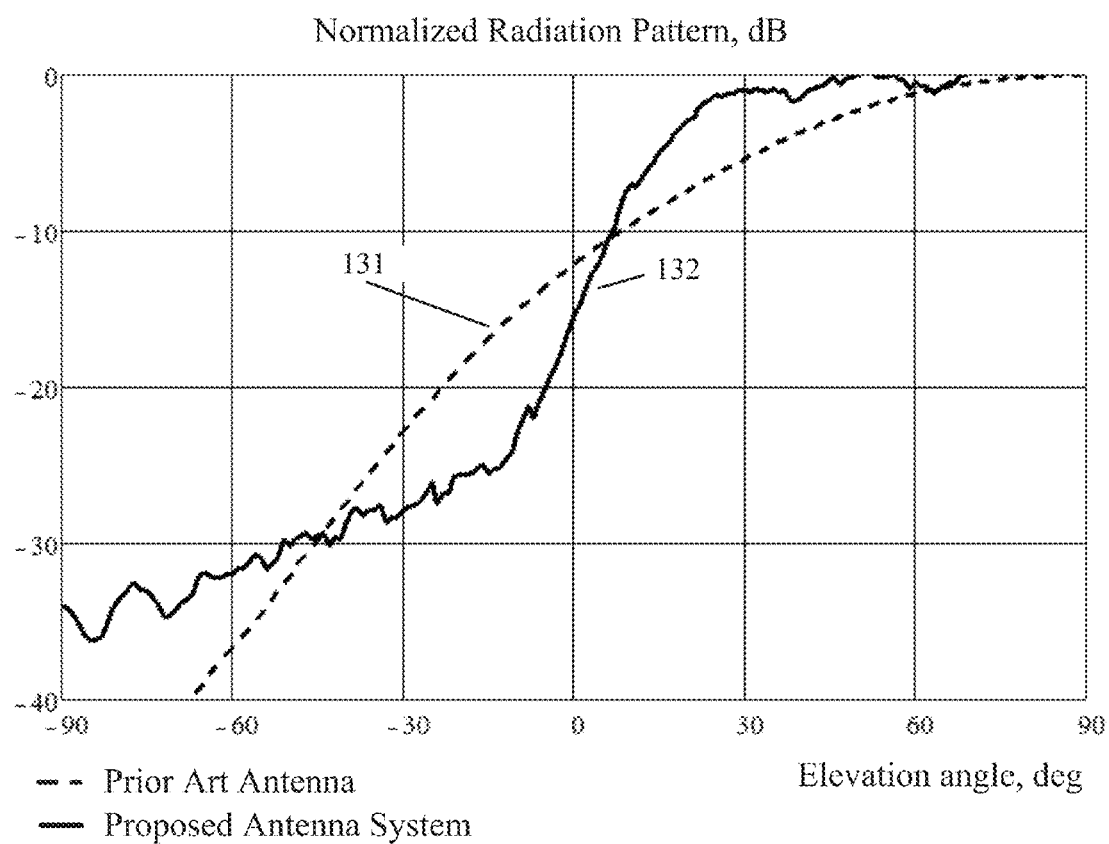

FIG. 13 shows graphs of normalized directional patters for an antenna system with spherical HICGP.

Figure 14:
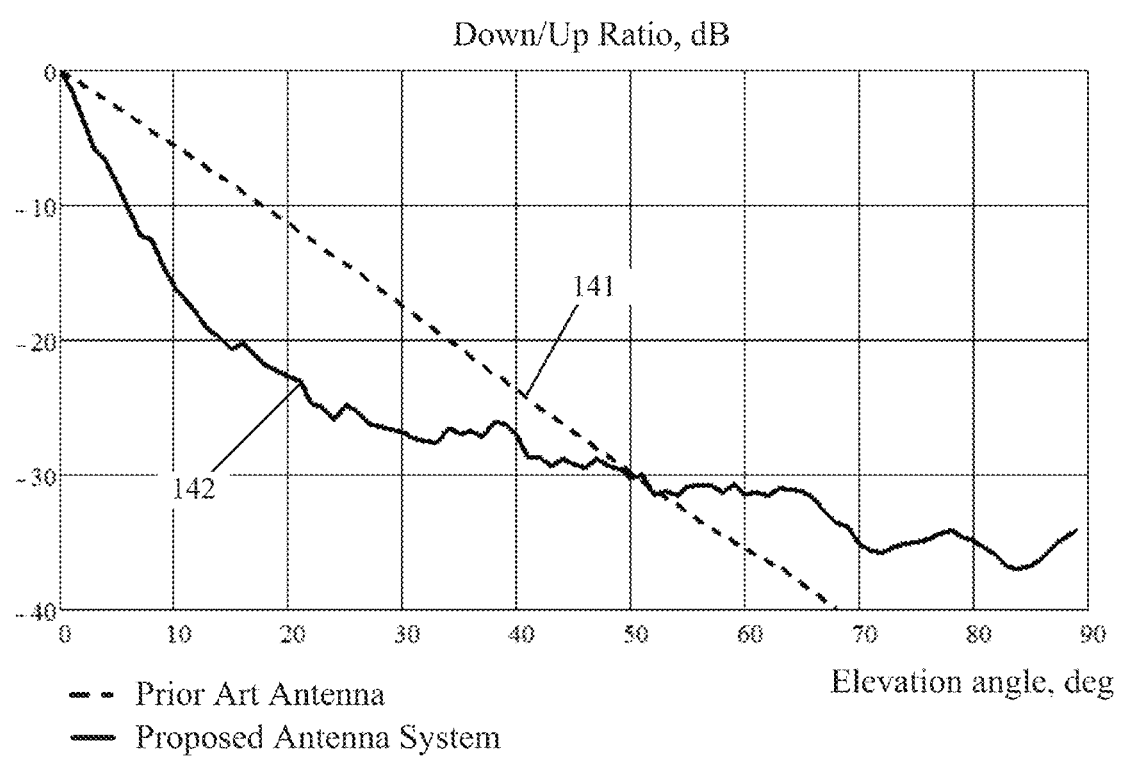

FIG. 14 shows graphs of Down/Up ratio for an antenna system with a spherical HICGP.

Figure 15:
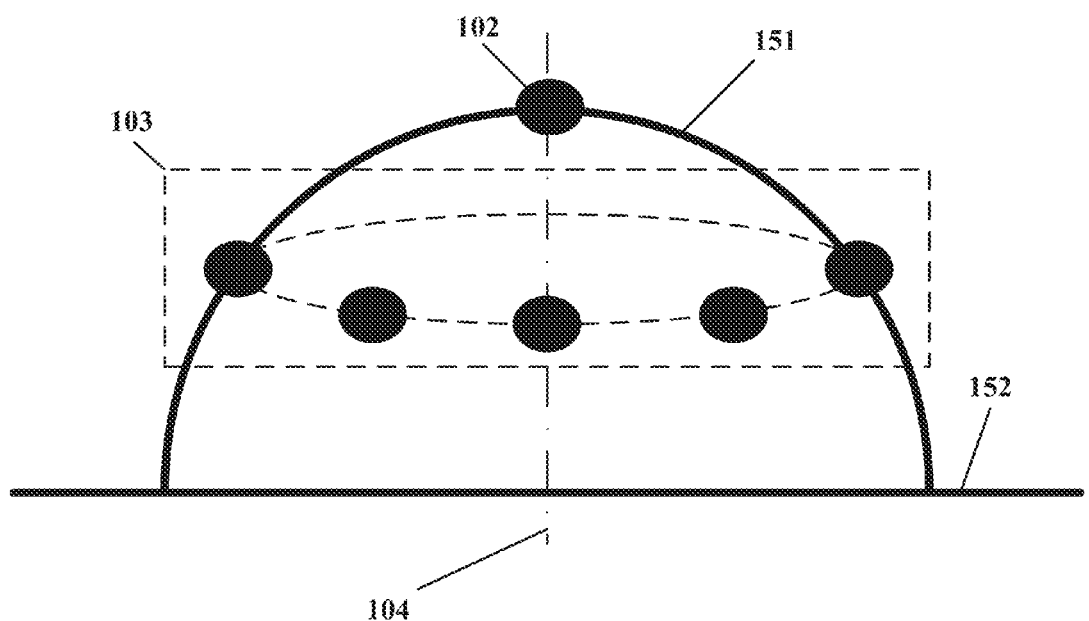

FIG. 15 shows one embodiment of the proposed antenna system with a spherical HICGP, whose continuation is a flat HICGP.

DETAILED DESCRIPTION OF EMBODIMENTS OF THE INVENTION

Reference will now be made in detail to the preferred embodiments of the present invention, examples of which are illustrated in the accompanying drawings.

Figure 1:
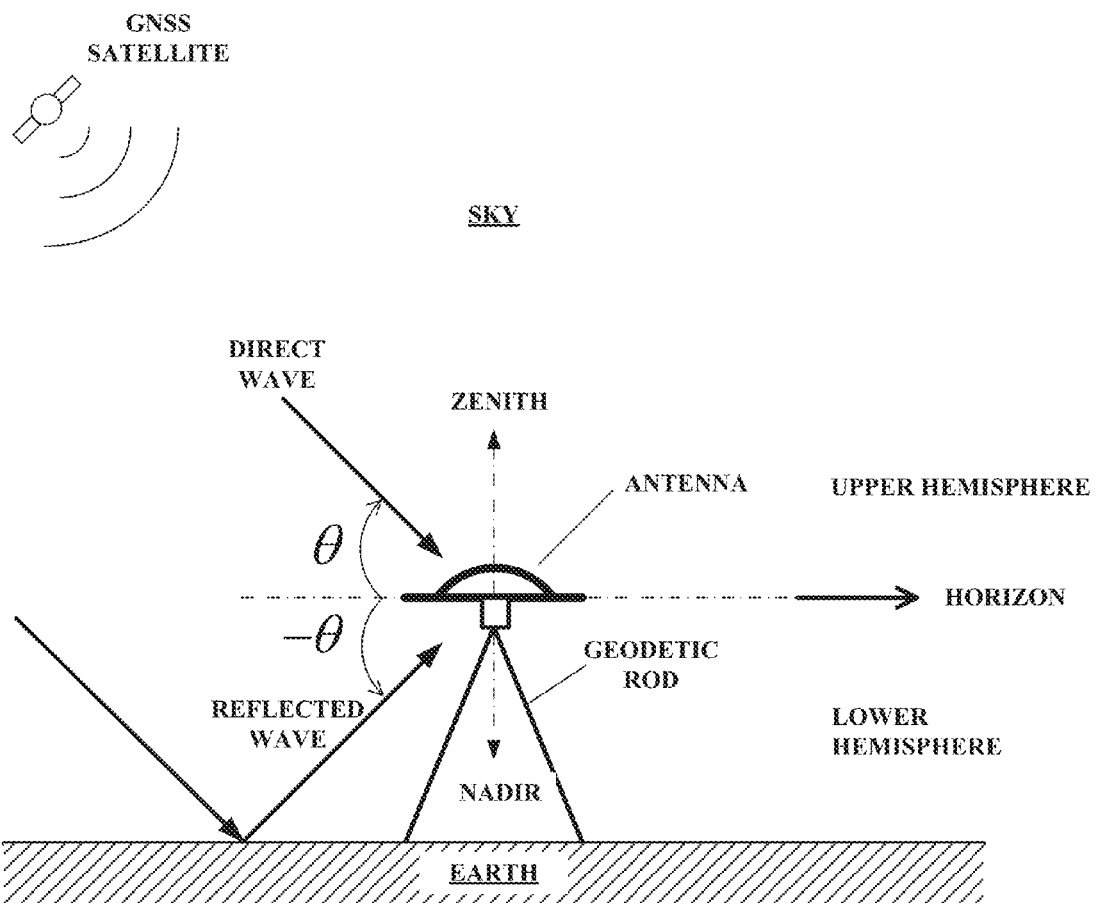

Navigation signals are received from satellites in the upper hemisphere up to elevation angles no more than 10° . . . 15° from the horizon. The signal reflected from the Earth's surface comes to the antenna from the side of the lower hemisphere. A conditional division of the space into upper (front) and lower (backward) hemispheres, and a schematic representation of incident and reflecting waves, is shown in FIG. 1. To provide reception of both navigation signals in the entire upper hemisphere and suppression of signals reflected from the ground, the antenna needs a sharp directional pattern (DP) cut-off below the horizon is needed which is possible when the antenna has a sharp difference of DP in the horizon direction.

As the antenna system receives signals from satellites located at an arbitrary point of the upper hemisphere, DP amplitude should have symmetry of rotation relative to an axis perpendicular to the horizon plane. This symmetry axis is called "vertical axis" in the present application.

Antennas employed in GNSS tasks are receiving ones. However, for some applications, they can be considered as transmitting. The reciprocity theorem governs the identity of antenna characteristics in receiving and transmitting modes.

If the antenna operates in a transmitting mode, the condition of qualitative reception of satellite signals, and at the same time suppression of multipath signals, means that a field radiated by the antenna should be high in the upper hemisphere and low in the lower hemisphere. We will consider transmitting operational mode hereinafter.

Figure 2:
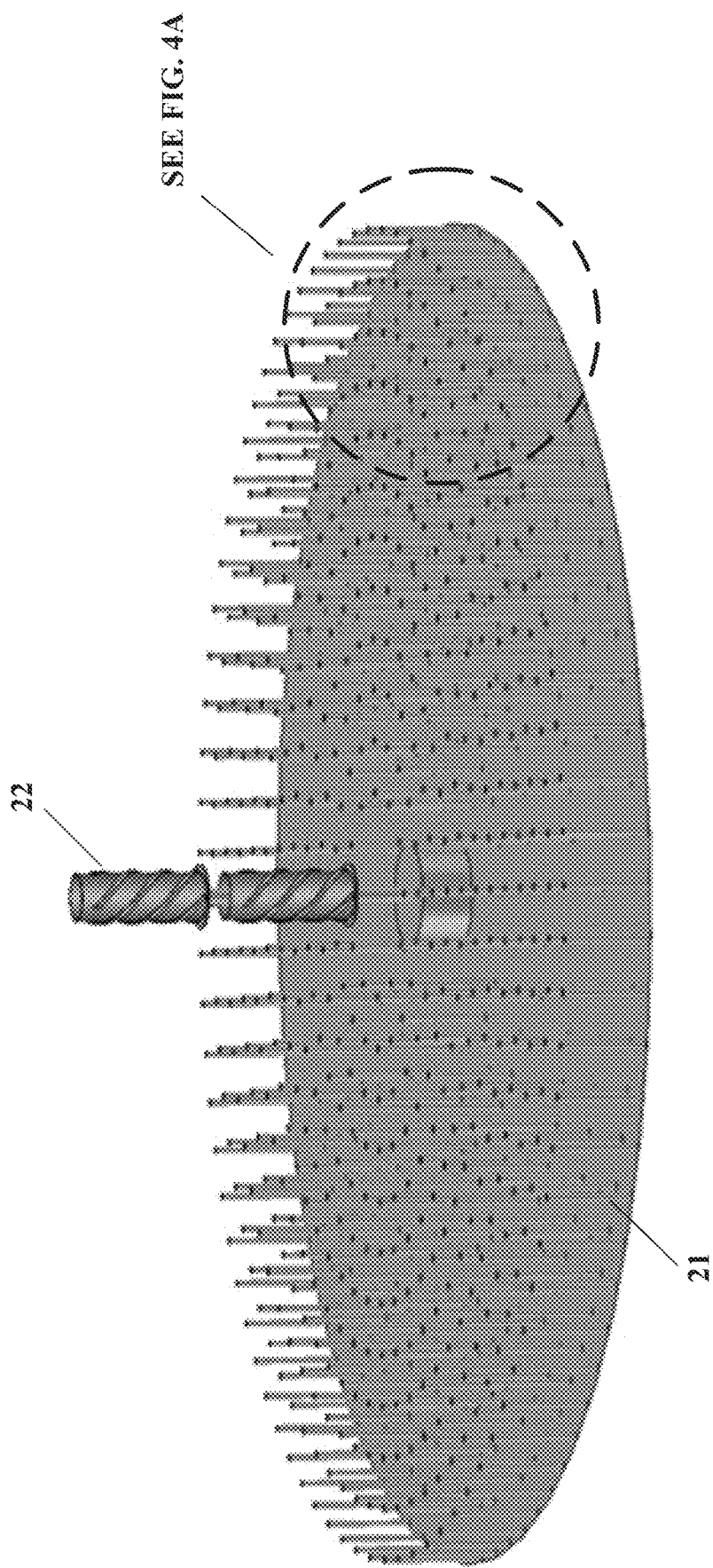

FIG. 2 presents one of embodiments of the proposed structure. It is a flat highly-impedance capacitive ground plane (HICGP) 21, in the center of which there are two or more antenna elements 22 one above another.

A schematic of the antenna system is shown in FIG. 3. Each antenna element 32 represents an antenna radiating right-hand circularly-polarized field (RHCP) in the upper hemisphere. Outputs of antenna elements 32 are connected to the combining network 34 with the help of feeders 33, which can be coaxial cables. The feeders are along vertical axis 31 passing through the center of the antenna system. This axis is oriented along the line zenith-nadir. The coaxial cables pass through holes in the center of the antenna elements. The combining network 34 provides excitation of antenna elements 32 at such amplitudes and phases that subtraction (compensation for) field in the lower hemisphere would be possible. The combining network can be in the center of conducting ground plane 351 in the closed metal cavity 37. The cavity can be both on conducting ground plane 351 and under it. A cable 36 is connected to the output of the combining network, and is further connected to a low-noise amplifier and then to a navigation receiver. In the figure, HICGP is designated by 35.

Figure 4A:
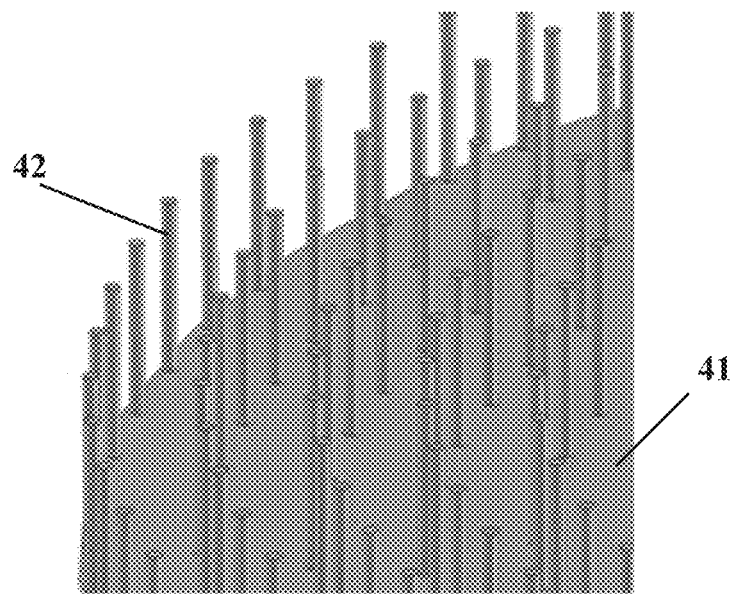
Figure 4B:
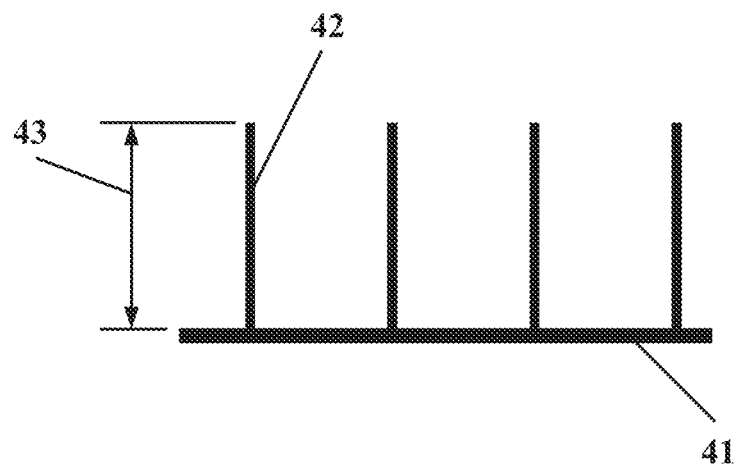

FIGS. 4A, 4B show a fragment of HICGP, which is a flat metal surface (metal ground plane) 41, on which there is a set of metal pins 42. Pins 42 are in galvanic contact with conducting ground plane 41. Length 43 of pins 42 is 0.25 . . . 0.35λ, where λ is the wavelength in vacuum. To provide azimuthal symmetry, pins 42 can be arranged along concentric circles.

Let us consider FIG. 5. Navigation satellites transmit signals with circular polarization (RHCP). Circularly-polarized electromagnetic field can be presented as a sum of fields of two linear polarizations $E_\theta$ and $E_\phi$ parallel to orts (unit vectors) $\vec{\theta}_0$ (51) and $\vec{\phi}_0$ (52) of the spherical coordinate system r, θ, φ. Vector $\vec{\theta}_0$ is tangential to the circle, the center of which coincides with the center of the conducting ground plane 53, and its plane is perpendicular to the plane of conducting ground plane 351. Vector $\vec{\phi}_0$ is parallel to the plane of ground plane 351 and perpendicular to vector $\vec{\theta}_0$. In FIG. 5 vector $\vec{\phi}_0$ is directed to the sheet plane.

To efficiently suppress multipath signals, the field of both polarizations should be mitigated in the lower hemisphere. Since suppression of the field in the lower hemisphere in the proposed structure is provided due to subtracting fields of different antenna elements, this subtraction needs to be done for fields of both polarizations. That means that component $E_\theta$ should be subtracted, and component $E_\phi$ should be subtracted as well. Hence, there is a need of controlling mutual relationships between amplitudes and phases of polarization fields $E_\theta$ and $E_\phi$.

The value of the field in the lower hemisphere depends on currents flowing through HICGP 35. Under the influence of field component $E_\theta$ electric current is induced in both pins 352 and conducting ground plane 351. Field component $E_\phi$ is perpendicular to pins 352, and it induces current only in ground plane 351. To additionally vary component $E_\phi$ and hence the ratio of $E_\theta$ and $E_\phi$, additional conductive elements in the form of concentric rings parallel to the conducting ground plane should be added. Current flowing in these rings will affect component $E_\phi$.

Figure 6A:
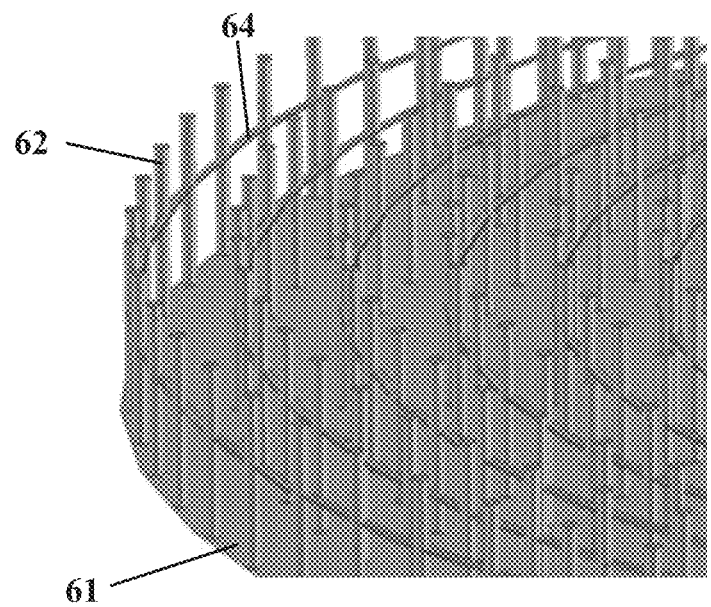
FIGS. 6A and 6B show a fragment of a flat HICGP with concentric rings parallel to a ground plane.
Figure 6B:
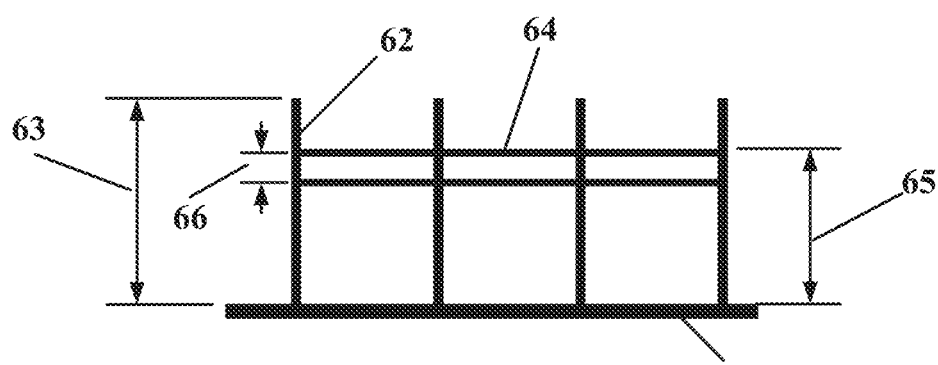

An embodiment shown in FIGS. 6A and 6B describes a HICGP design, where pins 62 with length 63 are along the concentric circles. The pins located at the same radius are connected between one another by a conducting ring 64 that is at a certain height 65 over conducting ground plane 61. Height 65 is less or equat to height 63. By varying this height, one can control the amplitude of current flowing in these rings and hence relationship between field components $E_\theta$ and $E_\phi$. Ring 64 has its own height 66 and width 67. Height 66 is less or equal to height 65. Width 65 is approximately equal to the diameter of a pin. The heights 65, 66 and 63 can be equal.

Figure 6C:
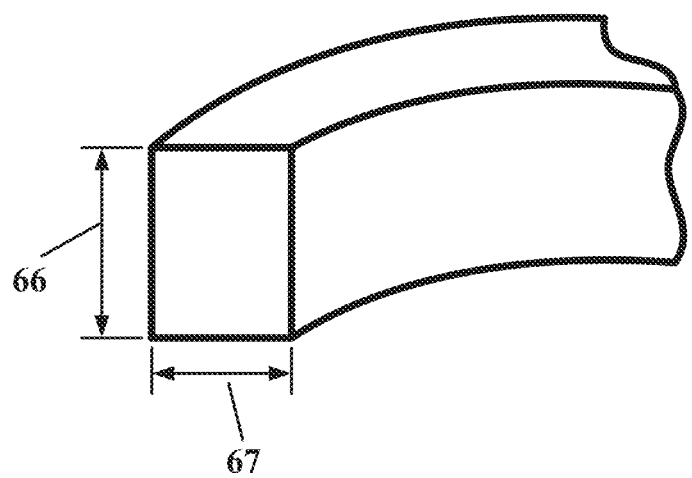
FIG. 6C shows dimensions of a conducting ring.

FIG. 6C shows a part of a conducting ring having height 66 and width 67.

Referring to FIG. 7, to avoid deep drops in DP in the upper hemisphere and provide a low coupling coefficient between antenna elements, each antenna element needs to have a low DP level in the nadir direction (no more than −10 . . . −15 dB). Top antenna elements 73 must add no distortion in DP of the lower-located antenna elements 72. So the diameter of antenna elements should be small enough (0.3λ and less). There are known technical solutions that allow achieving DP with a low level in the nadir direction at small antenna cross-dimension. For example, in U.S. Pat. No. 6,836,247 suppression of field in the nadir direction is implemented by using a passive element excited due to mutual coupling with all antenna element with a connected signal port (receiving antenna element). This passive element is under the receiving antenna element and is a conventional resonance patch antenna. Even though such a structure efficiently suppresses field in the nadir direction and its cross dimension can be small, it is difficult to use this structure as an antenna element. The fact is that a resonance element is located under the structure and its availability leads to strong DP distortion of the antenna element.

It is known (for example, PCT/RU 2013/001052) that helical antennas with a small helix diameter allow suppressing field in the nadir direction. Such a structure is elongated in the vertical direction and there are no resonance elements in the horizontal plane. Due to this fact, a placement of one antenna above another does not lead to intense distortions of DP for the lower antenna. Therefore antenna elements in the proposed antenna are made as cylindrical quadrifilar helical antennas with a low DP level in the nadir direction and a diameter of the ground plane no more than 0.3λ. Note that the lowest element can be any circularly-polarized antenna with a low DP level in the nadir direction. For example, it can be a conventional patch antenna or a spiral antenna similar to the top elements. Lower element 72 can be made similarly to the top antenna elements—as a helical antenna (FIG. 7A) or as a patch antenna with its own conducting ground plane (FIG. 7B).

Antenna elements can be fastened to tube 74 in the center of the antenna system, and inside this tube there are power cables from the antenna elements to the combining network.

As noted above, the combining network can be located inside a closed metal cavity 75 in conducting ground plane 71 or under it. It provides excitation of antenna elements at required amplitudes and phases. The combining network includes a set of power splitters and phase shifters. They can be produced in a standard manner, for instance, using microstrip lines.

Installation of antenna elements above HICGP guarantees efficient subtraction of fields in the lower hemisphere. It is premised on the fact that DP shape of each antenna element in the lower hemisphere is mainly determined by the size of the ground plane, while the type of the antenna element and its height over the ground plane affect only field amplitude in the lower hemisphere. A dependence of DP on angle θ at θ<0 is found to be the same for the first and second antenna elements. When fields of the first and second antenna elements are subtracted, the sum field in the entire lower hemisphere is efficiently compensated. It is illustrated by the experimental graphs given below.

Figure 8:
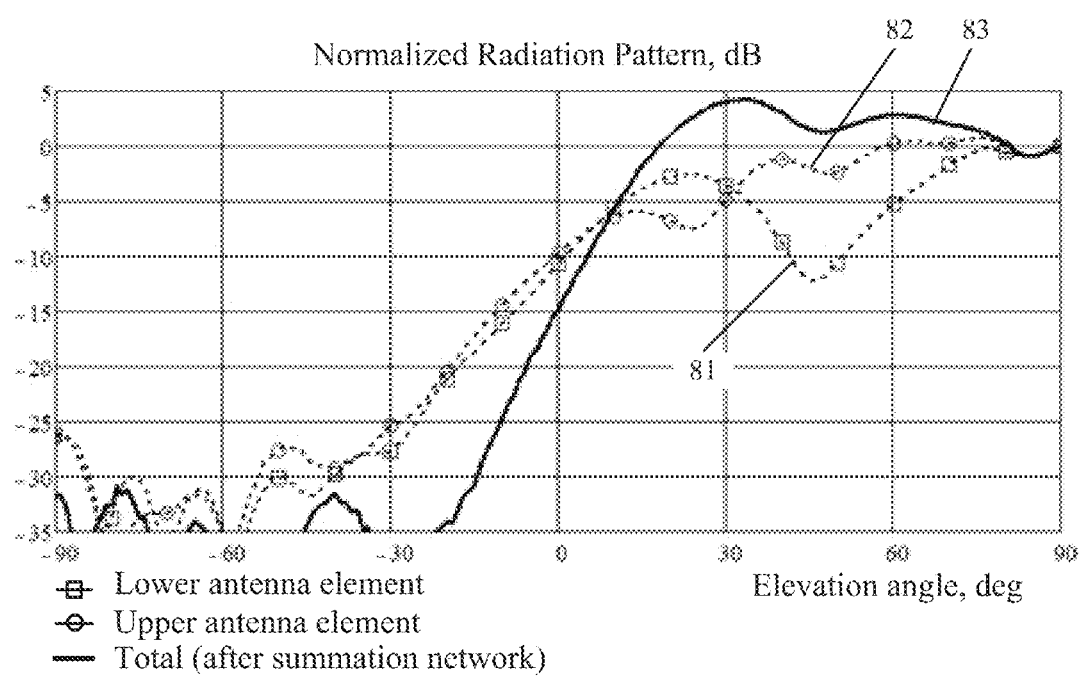
FIG. 8 shows graphs of normalized direction patterns for upper and lower antenna elements placed above a flat HICGP and a resulting direction pattern of the antenna system.

FIG. 8 presents normalized full power directional patterns F(θ) of the antenna system for the case of two antenna elements. Here $$F(\theta)(dB) = 10 \log\left(\frac{P(\theta)}{P(90°)}\right),$$

$P(\theta)=|E_\theta(\theta)|^2+|E_\phi(\theta)|^2$. Structure parameters are (see FIG. 3):

Ground plane diameter 1 m, operational frequency 1580 MHz,
Antenna elements—quadrifilar spirals with a circular ground plane with diameter 50 mm;
$H_1$=90 mm;
$H_2$=220 mm.

Dotted line 81 shows a DP for the lower antenna element, dotted line 82 shows a DP for the top antenna element. It can be seen that at θ<0 these lines practically match. Solid line 83 shows a sum DP when the equally-amplitude power splitter is connected. A signal phase relationship at the output of the power splitter was determined by cable lengths and height of radiators over the ground plane. The relationship was chosen such that the subtraction of the top antenna element's field and the lower antenna element's field would be in the lower hemisphere in the vicinity of the horizon. The sum DP 83 is seen to have a sharply declining character in the vicinity of the horizon.

A numerical value characterizing the ability to suppress reflected signals is a ratio $$\text{Down/Up} = \frac{F(-\theta)}{F(\theta)}.$$

FIG. 9 presents experimental graphs Down/Up: 91 is for one antenna element over a flat impedance ground plane at height H1 (as in the prior art), 92 is for two-element antenna system and 93 is three-element antenna system. The level of suppressing reflected signals for elevation angles θ>15° was: for one antenna element (Prior Art)—12 dB and less; for the proposed two-element antenna system—20 dB and less; for the three-element antenna system—30 dB and less.

Parameters of the structure are (see FIG. 3):
Ground plane diameter 1 m,
operational frequency 1580 MHz,
Antenna elements—quadrifilar helices with a circular ground plane with diameter 50 mm;
$L_1$=60 mm;
$H_1$=30 mm;
$H_2$=130 mm;
$H_3$=130 mm.

One more antenna element can be installed above the top antenna element; this element is not connected to the combining network, but is loaded on matched termination. Such a passive element allows improving the operational mode of the lower antenna element.

High-precision navigation satellite systems uses signals of two bands: high-frequency and low-frequency. For example, for GPS the central frequency of the low-frequency band is 1227 MHz, and high-frequency—1575 MHz. In this case antenna structure contains antenna elements receiving signals in both frequency bands. Dual-frequency combining network can be made with diplexers connected to each antenna element.

Another embodiment of the proposed antenna system shown in FIG. 10 includes a spherical HICGP 101, two antenna elements 102, 103 located outside HICGP over its surface and a combining network (not shown). The antenna system has a rotational symmetry relative to vertical axis 104. HICGP surface can be any convex surface with rotational symmetry relative to said vertical axis 104. However for practical purposes a spherical shape of HICGP is most preferable.

In FIG. 11A, the HICGP is a conducting sphere 111 with radius $R_1$ or a part of the sphere, on the surface of which there is a set of conducting pins 112 of length $L_2$=0.25 . . . 0.35λ. HICGP radius $R_2$ in FIG. 10 and FIG. 11A designates a surface 101, which is formed by the ends of pins 112: $R_2=R_1+L_2$. FIG. 11B shows a view of such HICGP.

Referring to FIG. 10, antenna element 102 is located outside HICGP near its surface on its vertical symmetry axis. It is an antenna radiating right hand circular polarization (RHCP) field in the zenith direction.

Antenna element 103 is a ring-shaped array of radiators placed outside HICGP near its surface. The ring array is a set of radiators located along the circle 105 with radius $R_c$. The surface of the ring along which the radiators are arranged is perpendicular to the vertical symmetry axis 104 of the antenna system and the ring center is on this axis. With the help of the excitation circuit (not shown), the radiators of the ring array are excited with equal amplitudes and a linear phase progression, such that an RHCP field would be excited. Such a ring-shaped array is known in the art. The excitation circuit of the ring-shaped array can fit into HICGP.

Antenna element 102 and antenna element 103 are spaced apart in the vertical axis at a distance $H_{c1}=\sqrt{R_2-R_2^2-R_c^2}$.

Any RHCP antennas with a cross dimension no greater than 0.5λ can be used as radiators. For example, micro-strip antennas with own conducting ground plane can be utilized.

Antenna elements 102 and 103 are connected via cables to the combining network providing their excitation such that field in the lower hemisphere would be subtracted. The combining network can be arranged inside spherical HICGP.

As an embodiment, two and more ring antenna elements may be used. In FIG. 12 there are shown two ring antenna elements 103 and 121. They are outside HICGP 101 near its surface, such that they are separated apart in space along vertical axis 104 of the antenna system. FIG. 12 uses the following designations: $H_{c1}$ is the distance between antenna elements 102 and 103, $H_{c2}$ is the distance between antenna elements 103 and 121 along vertical axis 104.

FIG. 13 presents normalized full power directional patterns $F(\theta)$ for the antenna system for the design schematically shown in FIG. 12. Dotted line 131 shows a DP of one antenna element located over the spherical HICGP (prior art antenna), and solid line 132—DP of the proposed antenna system with a spherical HICGP.

FIG. 14 presents graphs of ratios $$\text{Down/Up} = \frac{F(-\theta)}{F(\theta)}$$

for the antenna system design illustrated by FIG. 12. Dotted line 141 shows a graph Down/Up for one antenna element under spherical HICGP (prior art antenna), and solid line 142 shows a graph of Down/Up ratio for the proposed antenna system with a spherical. Graphs in FIG. 13 and FIG. 14 were obtained by numerical solution of the diffraction problem on an impedance sphere.

Parameters of the structure are:
Diameter of spherical HICGP $R_2 = 2.1\lambda$
Pin length $L_2 = 0.33\lambda$
$H_{c1} = 0.13\lambda$
$H_{c2} = 0.75\lambda$ As another embodiment for the spherical HICGP, HICGP 151 can be a part of the spherical HICGP, an extension of which is a flat HICGP 152. Such a design is schematically shown in FIG. 15.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

What is claimed is:

1. An antenna system for operating with circularly-polarized signals, the antenna system having a vertical axis relative to which amplitude directional pattern is symmetrical and a plane perpendicular to the vertical axis such that the antenna system has a right-hand circular polarization upward from the perpendicular plane, the antenna system comprising:
   a high impedance capacitive ground plane (HICGP);
   first and second antenna elements; and
   a combining network connected to the first and second antenna elements;
   wherein the first and second antenna elements are located above the HICGP and are separated along the vertical axis by a gap; and
   wherein the combining network subtracts signals received by the first element from signals received by the second element to produce an output signal representing the circularly-polarized signals received only from an upper hemisphere.

2. The antenna system of claim 1, wherein HICGP is spherical.

3. The antenna system of claim 2, wherein the first or second antenna element is a ring-shaped array of radiators located outside the high impedance capacitive ground plane and is located near its surface.

4. The antenna system of claim 3, wherein the ring shaped array is an plurality of radiators which are located on an imaginary ring surface perpendicular to the vertical axis of the antenna system.

5. The antenna system of claim 4, wherein the radiators of the ring-shaped array are excited with an equal amplitude signal with a linear phase progression such that a right hand circular polarized (RHCP) field would be excited in the vertical axis direction.

6. The antenna system of claim 3, wherein the HICGP is a part of a spherical HICGP, and its extension is a flat HICGP.

7. The antenna system of claim 1, wherein the HICGP includes a flat ground plane with a plurality of conducting pins.

8. The antenna system of claim 1, further comprising a passive quadrifilar cylindrical helical antenna element above the first and second antenna elements.

9. An antenna system having a vertical axis relative to which amplitude directional pattern is symmetrical and a plane perpendicular to the vertical axis such that the antenna system has a right-hand circular polarization upward from the perpendicular plane, the antenna system comprising:
   a ground plane;
   first and second antenna elements above the ground plane; and
   a combining network connected to the first and second antenna elements;
   wherein the first and second antenna elements are separated by a gap along the vertical axis,
   wherein the combining network subtracts signals received by the first element from signals received by the second element to produce an output signal, and
   wherein the ground plane is flat and includes a plurality of conducting pins.

10. The antenna system of claim 9, wherein a length of the conducting pins is $0.25\lambda$-$0.35\lambda$.

11. The antenna system of claim 10, wherein the conducting pins are galvanically coupled to the ground plane and are perpendicular to it.

12. The antenna system of claim 11, wherein the conducting pins are located along concentric circles.

13. The antenna system of claim 12, wherein the conducting pins located at the same radius are connected one to another by a conducting ring which is parallel to the ground plane and offset from it.

14. An antenna system having a vertical axis relative to which amplitude directional pattern is symmetrical and a plane perpendicular to the vertical axis such that the antenna system has a right-hand circular polarization upward from the perpendicular plane, the antenna system comprising:
   a high impedance capacitive ground plane (HICGP);
   first and second antenna elements above the HICGP; and
   a combining network connected to the first and second antenna elements;
   wherein the first and second antenna elements are arranged along the vertical axis, wherein the combining network subtracts signals received by the first element from signals received by the second element to produce an output signal, and wherein the first and second antenna elements are quadrifilar cylindrical helical antenna elements, each of which has a diameter no greater than 0.3λ and a maximum Down/Up ratio in a nadir direction for each element is about −12−−15 dB.

15. The antenna system of claim 14, wherein the first and second elements are separated by a gap on the vertical axis.

16. An antenna system having a vertical axis relative to which amplitude directional pattern is symmetrical and a plane perpendicular to the vertical axis such that the antenna system has a right-hand circular polarization upward from the perpendicular plane, the antenna system comprising:
   a high impedance capacitive ground plane (HICGP);
   first and second antenna elements above the HICGP; and
   a combining network connected to the first and second antenna elements;
   wherein the first and second antenna elements are arranged along the vertical axis,
   wherein the combining network subtracts signals received by the first element from signals received by the second element to produce an output signal, and
   wherein a lower element of the first and second elements is an antenna element receiving right hand circular polarized (RHCP) signals and having maximum Down/Up ratio in the nadir direction about −12−−15 dB.

17. The antenna system of claim 16, wherein the first and second elements are separated by a gap on the vertical axis.

18. The antenna system of claim 16, wherein the lower element is a patch antenna element.

19. The antenna system of claim 16, wherein an upper element of the first and second elements is a quadrifilar cylindrical helical antenna element.

* * * * *